Sept. 30, 1952     L. S. DISTIN ET AL     2,612,631
RECTANGULAR WAVE FORM INVERTER Filed Feb. 24, 1950     2 SHEETS—SHEET 1

Inventors
Lionel Sparke Distin
Cecil Victor Wilman
By

Patented Sept. 30, 1952

2,612,631

UNITED STATES PATENT OFFICE 2,612,631

RECTANGULAR WAVE FORM INVERTER

Lionel Sparke Distin, Chilwell, and Cecil Victor Wilman, Long Eaton, England, assignors to Ericsson Telephones Limited, London, England Application February 24, 1950, Serial No. 146,082
In Great Britain July 22, 1948

6 Claims. (Cl. 321—49)

1

Our invention relates to circuits for electrical interrupters of the kind provided with contacts for periodically modifying a circuit fed from a source of direct current in order to produce an alternating current in part of the said circuit and/or in a second circuit coupled thereto, and wherein change-over contact means on the interrupter periodically reverse the connections of the direct-current source to the primary winding of a transformer, thus allowing an alternating current to be drawn from the secondary winding. In such arrangements it is often desirable for the secondary voltage wave form to be as nearly rectangular as possible. In the interests of contact life, however, the primary current wave shape should be such that the current reaches a high value at some time subsequent to the instant of contact closure and later declines to substantially zero at some time prior to the instant of contact break.

The object of our invention is to provide a circuit in which the primary and secondary wave forms fulfill the above conditions.

According to our invention arrangements for obtaining an alternating electric current from a direct-current source wherein a circuit fed from the said direct-current source is periodically modified at interrupter contacts to provide an alternating electric current in a load circuit, are characterised in this, that one or more inductor/capacitor combinations arranged in parallel across the alternating current part of the circuit from one or more tuned circuits adapted to develop a substantially rectangular wave form in the alternating current in the load circuit from intermittent half cycles of approximately sinusoidal form in the alternating current derived directly from the interrupter contacts; in such arrangements for obtaining an alternating electric current the current carried by the interrupter contacts immediately prior to the instant of break is substantially zero.

Figure 1:
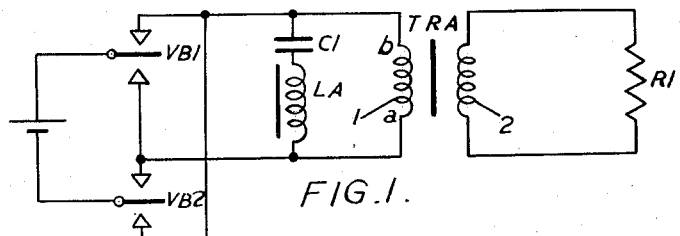
Figure 2:
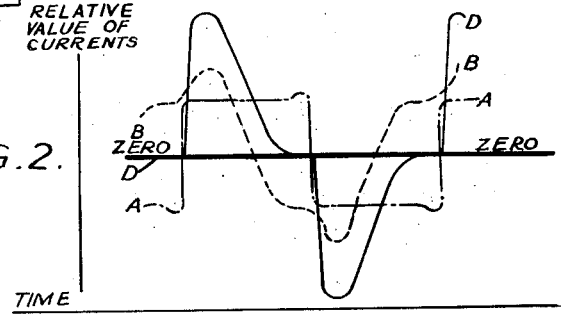
Figure 3:
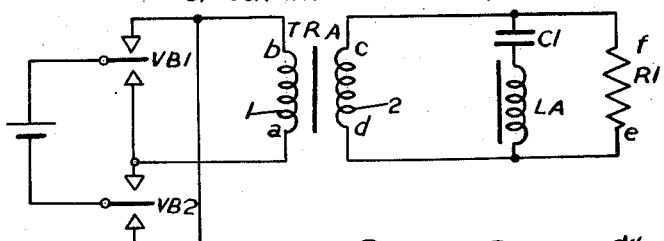
Figure 4:
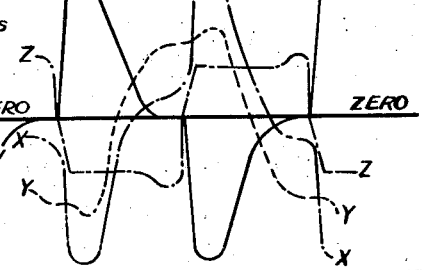
Figure 5:
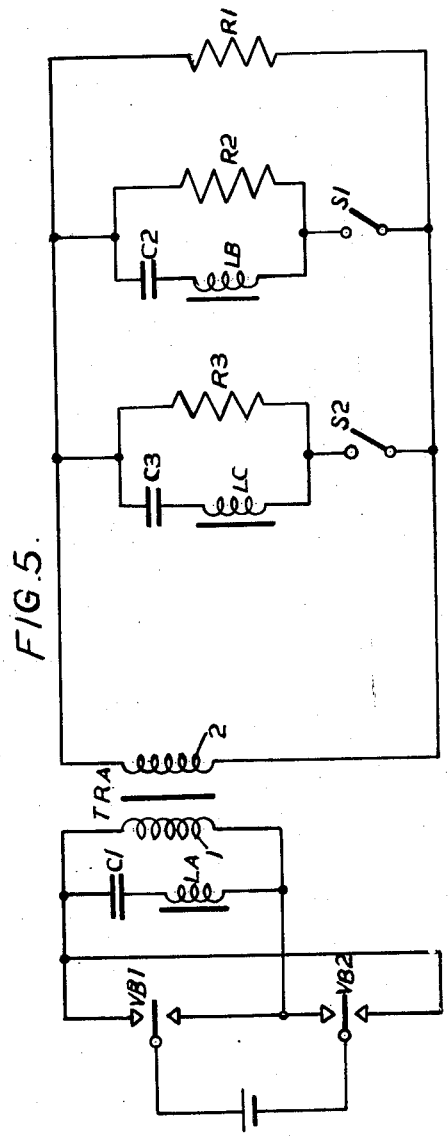

Other features of our invention will become apparent from the following description of various methods of carrying it into effect, and reference should now be made to the accompanying drawing in which Figs. 1, 3 and 5 show different circuit arrangements embodying our invention, and Figs. 2 and 4 show in the form of a chart the relation between the closed period of the interrupter contacts and the current values in different parts of the circuits depicted in Figs. 1 and 3 respectively.

Before proceeding to a description of the circuit arrangement shown in Fig. 1 reference will

2 be made to the chart shown in Fig. 2. In Fig. 2, line "A" depicts the wave form of the current in the primary winding 1 of transformer TRA (Fig. 1) which is necessary to maintain a substantially rectangular wave form in the secondary circuit, this wave form has been determined by cathode-ray oscilloscope analysis. Line "B" shows the wave form of the relative value of the current in the tuned circuit form by inductor/capacitor combination LA/C1 (Fig. 1) when the natural frequency of the said combination is in the region of 50% higher than the operating frequency of contacts VB1 and VB2 (Fig. 1). The wave form depicted by line "D" shows the relative value of the current which passes through contacts VB1 and VB2. These current wave forms are shown in relation to lines "E" and "F" on a common time basis. Lines "E" and "F" indicate the periods during which contacts VB1 and VB2 are closed on their upward and downward movement respectively.

Fig. 1 of the drawing shows an arrangement wherein a pair of reversing contacts VB1 and VB2, forming part of an electromagnetic interrupter, are arranged to move together upwards and downwards alternately, and in so doing to reverse periodically the connections of a direct-current source, represented by a conventional battery symbol, to the primary winding 1 of transformer TRA and an inductor/capacitor combination LA/C1. The movement of contacts VB1 and VB2 is maintained at a uniform rate by an electromagnetic device fed from a source of direct current over a self-interrupting circuit, such arrangements are well known and are not shown in the drawing. Pulses from alternate poles of the direct-current source are thus fed by way of contacts VB1 and VB2 to the primary circuit consisting of winding 1 of transformer TRA and inductor/capacitor combination LA/C1 in parallel. The pulses of current in winding 1 of transformer TRA induce an alternating current in the secondary winding 2 of transformer TRA, which together with resistor R forms the secondary circuit.

Inductor/capacitor combination LA/C1 is arranged to form a tuned circuit with a natural frequency in the order of 50% higher than the cyclic operating frequency of contacts VB1 and VB2. The energy-storage capacity of this tuned circuit is governed by the effective impedance of the "loaded" transformer TRA, and is of such a value that the current in winding 1 of transformer TRA immediately prior, and subsequent, to the opening of contacts VB1 and VB2 is maintained at the optimum value necessary for the maintenance of a current of substantially rectangular wave form in winding 2 of transformer TRA and the load circuit.

Transformer TRA is of known type and may be provided with a core of ungapped silicon-iron in which the remanent flux under operating conditions is likely to be in the region of 80% of the maximum flux.

Under running conditions the tuned circuit formed by inductor/capacitor combination LA/CI receives a pulse of current on each occasion that contacts VBI and VB2 close, the magnitude of the said pulse rises to its maximum shortly after the said contacts VBI and VB2 close and thereafter declines until it reaches zero a short time before contacts VBI and VB2 open, see line "B" Fig. 2. After passing the zero value the oscillatory current derived from the tuned circuit commences to flow in the reverse direction, the magnitude of this current continues to rise throughout the conclusion of the contact-closed period and the following "float" or contact-open period, and is still rising when contacts VBI and VB2 close on the subsequent half cycle of operation.

For the purpose of explanation we will assume that the said oscillatory current derived from the tuned circuit is flowing through winding 1 of transformer TRA in the direction "a" to "b" during the float period before the upper side of contacts VBI and VB2 is closed. When contacts VBI and VB2 close, current flows from the direct-current source by way of the said contacts to inductor/capacitor combination LA/CI in the same direction as the existing oscillatory current in the said combination, and through winding 1 of transformer TRA in the direction "b" to "a," that is, in the reverse direction to the oscillatory current derived from the tuned circuit during the preceding float period.

In consequence of the rapid increase in the magnitude of the current through winding 1 of transformer TRA, together with the rising value of the current pulse to the tuned circuit formed by inductor/capacitor combination LA/CI as described previously, the current through contacts VBI and VB2 rises to its maximum value shortly after the said contacts close, see line "D" Fig. 2.

The pulse of current by way of contacts VBI and VB2 through winding 1 of transformer TRA is maintained at a constant value during the period in which the magnitude of the current pulse to the tuned circuit falls to zero. At the conclusion of that period, the oscillatory current derived from the tuned circuit commences to flow in the reverse direction to the previous current pulse, this current passes through winding 1 of transformer TRA in the direction "b" to "a," that is, in the reverse direction to the flow of current from the tuned circuit during the preceding float period, and in the same direction as the existing current pulse from contacts VBI and VB2. The magnitude of the current derived from the tuned circuit formed by inductor/capacitor combination LA/CI increases at a uniform rate, and in circulating through winding 1 of transformer TRA reduces the value of the current pulse drawn from the direct-current source by way of contacts VBI and VB2 at a substantially equivalent rate until it reaches zero, at which instant the current derived from the tuned circuit is of sufficient magnitude to maintain the magnetisation of the loaded core of transformer TRA.

The natural frequency of the tuned circuit is arranged to be such that the instant the value of the current through contacts VBI and VB2 reaches zero is substantially coincident with the opening of the said contacts VBI and VB2. During the float period following the opening of contacts VBI and VB2 the flow of current from the direct-current source ceases, but the flow of current from the tuned circuit through winding 1 of transformer TRA continues in the same direction, and maintains the magnetisation of the loaded core of transformer TRA throughout the float period. Thus the current through the primary winding 1 of transformer TRA, and the resultant induced current in the secondary winding 2 and the load circuit, represented by resistor R, has a substantially rectangular wave form throughout the greater part of the contact-closed and subsequent float periods.

When contacts VBI and VB2 close on their lower side, current from the direct-current source is again fed to inductor/capacitor combination LA/CI and winding 1 of transformer TRA but in the reverse direction to the previous pulse, and the current values in the different portions of the circuit follow a sequence of changes similar to that described previously, except that the direction of the current flow is reversed in consequence of the reverse polarity of the connections of the direct-current source to the circuit. The conclusion of the current pulse from the lower side of contacts VBI and VB2 is followed by a float period, and the condition of the circuit is then similar to that described previously, in which the current derived from the tuned circuit flows through winding 1 of transformer TRA in the direction "a" to "b," and maintains the magnetisation of the loaded core of transformer TRA.

Further cycles of contact operation maintain the sequence of current changes with the resultant sinusoidal wave form of the current drawn from the direct-current source, and a current of substantially rectangular wave form in the load circuit.

A further arrangement of our invention in which the tuned circuit is placed in parallel with the secondary winding of a transformer, and the load circuit, is shown in Fig. 3, and an associated chart showing the current wave forms is depicted in Fig. 4. Referring to Fig. 4, line "W" shows the wave form of the current drawn from the direct-current source through the interrupter contacts VBI and VB2, line "X" shows the wave form of the current through the secondary winding 2 of transformer TRA, line "Y" shows the wave form of the current in the tuned circuit formed by inductor/capacitor combination LA/CI, and line "Z" shows the wave form of the current in the load circuit represented by resistor R; these wave forms are substantially in accordance with the current wave forms in a typical arrangement of the circuit shown in Fig. 3 as depicted on a cathode-ray oscilloscope. The closed period of contacts VBI and VB2 is indicated by lines "E" and "F" as in Fig. 2.

Fig. 3 of the drawing shows an arrangement wherein a pair of reversing contacts VBI and VB2, forming part of an electromagnetic interrupter, are arranged to move together upwards and downwards alternately, and in so doing to reverse periodically the connections of a direct-current source, represented by a conventional battery symbol, to the primary winding 1 of transformer TRA. The movement of contacts VBI and VB2 is maintained at a uniform rate by an electromagnetic device of known type as previously described, and pulses from alternate poles of the direct-current source are thus fed by way of contacts VB1 and VB2 to the primary circuit formed by winding 1 of transformer TRA. The pulses of current in winding 1 of transformer TRA induce an alternating current in the secondary winding 2 of transformer TRA. In parallel with winding 2 of transformer TRA is arranged an inductor/capacitor combination LA/C1 which forms a tuned oscillatory circuit with a natural frequency in the order of 50% higher than the cyclic operating frequency of contacts VB1 and VB2. The load from winding 2 of transformer TRA, and the tuned circuit formed by inductor/capacitor combination LA/C1, is carried by resistor R which completes the secondary circuit.

The energy-storage capacity of the tuned circuit is governed by the impedance of the load circuit, and is of such a value that under running conditions the substantially rectangular wave form of the current in resistor R, which constitutes the load circuit, is maintaind immediately prior, and subsequent, to the opening of contacts VB1 and VB2. Transformer TRA is of known type as described previously.

Under running conditions a pulse of current is derived in the secondary circuit from winding 2 of transformer TRA on each occasion that contacts VB1 and VB2 close, a portion of the said pulse serves to energise the tuned circuit formed by inductor/capacitor combination, LA/C1, and the remainder flows through the load circuit represented by resistor R. The value of the current pulse to the tuned circuit rises to its maximum shortly after contacts VB1 and VB2 close, and thereafter declines until it reaches zero a short time before the said contacts open, see line "Y," Fig. 4. After passing the zero value, the oscillatory current derived from the tuned circuit commences to flow in the reverse direction to the preceding energising pulse, the magnitude of this current continues to rise throughout the period in which contacts VB1 and VB2 are closed and the following float or contact-open period, and is still rising when the said contacts close on the subsequent half-cycle of operation. The current in winding 2 of transformer TRA is derived from two sources, namely, that which is induced directly from winding 1, and that which is derived from the tuned circuit during the float period of contacts VB1 and VB2. This latter current flows in the reverse direction to the preceding pulse of induced current, and is still flowing through winding 2 of transformer TRA when contacts VB1 and VB2 close on the subsequent half cycle of operation, see line "X," Fig. 4.

For the purpose of explanation we will assume that the said oscillatory current derived from the tuned circuit, formed by inductor/capacitor combination LA/C1, is flowing through winding 2 of transformer TRA in the direction "c" to "d," and through the load circuit represented by resistor R in the direction "f" to "e", during the float period which precedes the closing of contacts VB1 and VB2 upwards. When the upper side of contacts VB1 and VB2 is closed, current flows from the direct-current source by way of the said contacts through winding 1 of transformer TRA in the direction "b" to "a" and induces a current in winding 2 which flows in the direction "c" to "d." The induced current flows from winding 2 of transformer TRA to the tuned circuit in the same direction as the existing oscillatory current in the said combination, and through resistor R in the direction "e" to "f," that is in the reverse direction to the current derived from the tuned circuit during the preceding float period.

The impedance of the primary and secondary circuits is low at the commencement of each pulse, and the magnitude of the current increases rapidly in both circuits until it reaches its maximum value shortly after contacts VB1 and VB2 close, and coincident with the peak value of the current pulse to inductor/capacitor combination LA/C1, see line "W," Fig. 2. After reaching its peak value the magnitude of the current pulse to inductor/capacitor combination LA/C1 gradually falls to zero, and the value of the current in both the primary and secondary circuits declines at a substantially similar rate. The value of the current through the load circuit, represented by resistor R, reaches its optimum value very shortly after the commencement of the induced current pulse, and remains at substantially the same value during the period in which the magnitude of the current pulse to the tuned circuit falls to zero.

After the value of the current in the tuned circuit formed by inductor/capacitor combination LA/C1 reaches zero, the oscillatory current derived from the said tuned circuit commences to flow in the reverse direction to the previous current pulse. This current from the tuned circuit passes through resistor R in the direction "e" to "f," that is, in the reverse direction to the flow of current from the tuned circuit during the preceding float period, and in the same direction as the existing induced current pulse from winding 2 of transformer TRA. The magnitude of the current derived from the circuit formed by inductor/capacitor combination LA/C1 increases at a uniform rate, and in circulating through the load circuit, represented by resistor R, reduces the value of the current pulse derived from winding 2 of transformer TRA at a substantially equivalent rate until it reaches zero, at which instant the current derived from the tuned circuit is of sufficient magnitude to maintain the value of the current in the load circuit, represented by resistor R, at substantially the optimum value.

The impedance of the primary winding 1 of transformer TRA increases concurrently with the reduction of the current value in the secondary winding 2, and the value of the current pulse drawn from the direct-current source is consequently reduced at a substantially similar rate until it reaches zero, see line "W," Fig. 4. The natural frequency of the tuned circuit is arranged to be such that the instant the value of the current through contacts VB1 and VB2 reaches zero is substantially coincident with the opening of the said contacts VB1 and VB2.

Current from the direct-current source ceases to flow in winding 1 of transformer TRA during the float period when contacts VB1 and VB2 are open, and in consequence the induced current in winding 2 also ceases. The value of the oscillatory current derived from the tuned circuit continues to rise, and a proportion of this current commences to flow in winding 2 of transformer TRA in the direction "d" to "c" after the value of the induced current therein has fallen to zero, the remaining portion of the oscillatory current continues to flow in the load circuit in the direction "e" to "f," and maintains the value of the current therein at substantially the optimum value throughout the float period, see line "Z," Fig. 4.

Thus while the current through the interrupter contacts VB1 and VB2 has a substantially sinusoidal wave form the current in the load circuit has a substantially rectangular wave form. The direction of the flow of current in the various parts of the secondary circuit during the float period which follows the closing of contacts VB1 and VB2 upwards is opposite to that which prevailed during the float period which preceded the closing of the said contacts, and in subsequent half cycle of operations when contacts VB1 VB2 close in a downward direction a similar sequence of current changes occur, except that the direction of the current flow is reversed in consequence of the changed conditions existing at the commencement of the half cycle and the reversed polarity of the connections of the direct-current source to the circuit.

Further cycles of contact operation maintain the sequence of current changes with the resultant substantially sinusoidal wave form of the current drawn from the direct-current source, and a circuit of substantially rectangular wave form in the load circuit.

Circuit arrangements of the type shown in Figs. 1 and 3 are not inherently compensated for major variations of the load circuit, and although at a given load a particular tuned circuit may reduce the current through the contacts at the instant of break to zero, a current may flow through the contacts in one direction or the other if the load is changed. In such cases it may be convenient to deal with such variations in the load by providing each switched unit of the load circuit with its own tuned circuit.

Many other circuit arrangements embodying our invention will become obvious to those skilled in the art after the principles herein described are understood, for example, an inductor/ capacitor combination forming a tuned circuit may be connected in parallel across interrupter contacts and adapted to commutate the resulting alternating current under "no-load" conditions, under "load" conditions one or more other such tuned circuits or other known methods may be employed to modify the current wave form to the desired shape. Such an arrangement is illustrated in Figure 5 in which one tuned circuit fixed in parallel with the primary winding 1 of transformer TRA is adapted to modify the wave form of the current drawn from a direct-current source by way of reversing contacts VB1 and VB2 under minimum load conditions. Whilst other tuned circuits each placed in parallel with a separate independently-switched portion of a variable load circuit, are adapted to maintain the said modified wave form of the current drawn from the direct-current source, and to maintain a wave form of substantially rectangular shape in the current in the load circuit drawn from the secondary winding 2 of transformer TRA, with each variation of the said load circuit. Transformer TRA is of known type as described with reference to Fig. 1.

The tuned circuit in parallel with primary winding 1 of transformer TRA consists of inductor/capacitor combination LA/C1 and is arranged to have a natural frequency of the order of 50% higher than the cyclic frequency of contacts VB1 and VB2. The energy storage capacity of this tuned circuit is governed by the effective impedance of transformer TRA under minimum load conditions. These said minimum load conditions may arise from the impedance of transformer TRA under "no-load" conditions or constant load conditions and is represented by the resistor R1.

The variable portion of the load is shown in two parts represented by resistors R2 and R3, and each part is independently connected to the secondary winding 2 of transformer TRA by means of switches S1 and S2 respectively. The total variable load may consist of a number of such parts to the maximum load capacity of the transformer TRA and contacts VB1 and VB2, and each such part need not impose a load of similar value. The tuned circuit connected in parallel to each such part of the load takes the form of an inductor/capacitor combination as shown by LB/C2 and LC/C3 connected to R2 and R3 respectively, and is arranged to have a natural frequency of the order of 50% higher than the cyclic operating frequency of contacts VB1 and VB2. The energy storage capacity of each such tuned circuit is governed by the impedance of its associated part of the load.

Under minimum load conditions the operation of the arrangement shown in Figure 5 is similar to that described with reference to Fig. 1, in which pulses from alternate poles of the direct-current source are fed by way of reversing contacts VB1 and VB2 to the primary winding 1 of transformer TRA and inductor/capacitor combination LA/C1 in parallel. When operating with the said minimum load conditions in the manner described the characteristics of the operative tuned circuit formed by inductor/capacitor combination LA/C1 are such that the resultant wave form of the current in primary winding 1 of transformer TRA, the wave form of the relative value of current in the tuned circuit formed by inductor/capacitor combination LA/C1, and the wave form of the relative value of current through contacts VB1 and VB2 are substantially as depicted by lines A, B, and D respectively in relation to lines E and F in Fig. 2.

Thus under minimum load conditions the wave form of the current through contacts VB1 and VB2 is substantially sinusoidal in shape, and that of the current in the load circuit is substantially rectangular in shape.

The shape of the current wave forms may be maintained substantially in accordance with those depicted in Fig. 2 when the load circuit is varied by suitably modifying the component values of the tuned circuit formed by capacitor/ inductor combination LA/C1 concurrently with each variation of the load circuit, and in such manner that the changed impedance from the varied load in association with the said modified values of the capacitor/inductor combination LA/C1 maintains the desired wave-shaping effect of the tuned circuit upon the different values of current in the arrangement. Such an arrangement however has practical disadvantages, and the desired wave shapes may be maintained by providing each variable factor in the load circuit with its particular tuned circuit in the manner depicted in the drawing.

The detailed operation of the arrangement shown in Fig. 5 under increased load conditions is similar to that described with reference to Fig. 3 in which the tuned circuit is placed in parallel with the secondary winding 2 of transformer TRA and a load circuit R.

The characteristics of the tuned circuit formed by inductor/capacitor combination LA/C1 are adapted to modify the wave shape of the minimum load current only, and in the absence of the switched tuned circuits formed by inductor/capacitor combinations LB/C2 and LC/C3 the wave shape of the current pulse derived from contacts VB1 and VB2 would assume a substantially rectangular shape when loads R2 and R3 were connected to the secondary winding 2 of transformer TRA. With the said inductor/capacitor combinations LB/C2 and LC/C3 connected in parallel with loads R2 and R3 respectively and switch S1 closed, the oscillatory current derived from the tuned circuit formed by inductor/capacitor combination LB/C2 is such that the wave form of the current drawn from the direct-current source by way of contacts VB1 and VB2, the wave form of the current in secondary winding 2 of transformer TRA, the wave form of the current in the said tuned circuit LB/C2, and the wave form of the current in loads R2 and R1 are each substantially as depicted by lines W, X, Y and Z respectively in Fig. 4.

The wave form of the current in the component parts of the arrangement shown in Fig. 5 is maintained substantially in accordance with lines W, X, Y and Z of Fig. 4 with the addition of each subsequent load in accordance with R3 LC/C3, and S2, and similarly is maintained with the removal of each such load until the last switched load is disconnected when the wave form of the current reverts to the shapes depicted by lines A, B and D in Fig. 2.

The wave-shaping effect of capacitor/inductor combination LA/C1 is not lost on the subsequent inclusion of one or more other tuned circuits in the form of capacitor/inductor combinations LB/C2 and LC/C3, and the sum effect of the said tuned circuits is to maintain the wave form of the current through contacts VB1 and VB2 in a substantially sinusoidal shape concurrently with the production of a current with a substantially rectangular wave form in the load circuit.

Our invention may be included in an arrangement employing a transformer with a centre-tapped primary winding which is fed in known manner by a single change-over contact.

We claim:

1. In an arrangement for obtaining alternating current of rectangular wave form from a direct current source by reversing interrupter contact means in circuit with said source, the combination with a transformer, conductively separated primary and secondary windings in said transformer, said primary winding connected to said contact means and supply from said source by periodic closure of said contact means with alternating current, and said secondary winding connected to a load circuit for supplying alternating current to said load circuit, of a capacitor and an inductor connected in series to form a capacitor/inductor combination, said capacitor/inductor combination connnected in parallel with one winding of the transformer to form a tuned oscillatory circuit having a natural frequency higher than the operating frequency of the contact means such that the current pulses in said tuned circuit decline to zero and reverse prior to each opening of the contact means and the reversed currents in said tuned circuit maintain magnetisation of the transformer and thereby the rectangular wave form in the load circuit and reduce current through the contact means sinusoidally to zero prior to and during each open float period of said contact means.

2. In an arrangement for obtaining an alternating current of rectangular wave form from a direct current source by means of reversing interrupter contact contacts in circuit with said source, the combination with a transformer, conductively separate primary and secondary windings in said transformer, said primary winding connected to said reversing interruptor contacts and supplied from said source by periodic closure of said contacts with an alternating current, and said secondary winding connected to a load circuit for supplying alternating current to said load circuit, of a capacitor and an inductor connected in series to form a capacitor/inductor combination, said capacitor/inductor combination connected in parallel with the primary winding of the transformer to form a tuned oscillatory circuit having a natural frequency higher than the operating frequency of the contact means such that the current pulses in said tuned circuit decline to zero and reverse prior to each opening of the contact means and the reversed currents in said tuned circuit maintain current in said primary winding and thereby the rectangular wave form in the load circuit and reduce current through the contact means sinusoidally to zero prior to and during each open float period of said contact means.

3. In an arrangement for obtaining an alternating current of rectangular wave form from a direct current source by means of at least one reversing interruptor contact in circuit with said source, the combination with a transformer, conductively separate primary and secondary windings in said transformer, said primary winding connected to said reversing interruptor contacts and supplied from said source by periodic closure of said contact with an alternating current, and said secondary winding connected to a load circuit for supplying alternating current to said load circuit, and a capacitor and an inductor connected in series to form a capacitor/inductor combination, said capacitor/inductor combination connected in parallel with the secondary winding of the transformer to form a tuned oscillatory circuit having a natural frequency higher than the operating frequency of the contact means such that the current pulses in said tuned circuit decline to zero and reverse prior to each opening of the contact means and the reversed currents in said tuned circuit maintain current in said secondary winding and thereby the rectangular wave form in the load circuit and inductively through said secondary winding reduce current through the contact means sinusoidally to zero prior to and during each open float period of said contact means.

4. In an arrangemnt for obtaining an alternating current of rectangular wave form from a direct current source by means of reversing interruptor contacts in circuit with said source, the combination with a transformer, conductively separate primary and secondary windings in said transformer, said primary winding connected to said reversing interruptor contacts and supplied from said source by said contacts with an alternating current, and said secondary winding connected to a load circuit for supplying alternating current to said load circuit, of capacitors and inductors connected one of each in series to form each of two capacitor/inductor combinations, one of said capacitor/inductor combinations connected in parallel with said primary winding and the other of said capacitor/inductor combinations connected in parallel with said secondary winding of the transformer to form a tuned oscillatory circuit having a natural frequency higher than the operating frequency of the contact means such that the current pulses in said tuned circuit decline to zero and reverse prior to each opening of the contact means and the reversed currents in said tuned circuit maintain current in said primary and secondary windings and thereby the rectangular wave form in the load circuit and reduce current through the contact means sinusoidally to zero prior to and during each open float period of said contact means.

5. In an arrangement for obtaining an alternating current of rectangular wave form from a direct current source by means of at least one reversing interruptor contact in circuit with said source, the combination with a transformer, conductively separate primary and secondary windings in said transformer, said primary winding connected to said reversing interruptor contacts and supplied from said source by said contact with an alternating current, and said secondary winding connected to a load circuit for supplying alternating current to said load circuit, of a plurality of parallel parts in said load circuit independently connectable with said secondary winding, a switch in each of said parts, and capacitors and inductors connected one of each in series to form each of a plurality of capacitor/inductor combinations, one of said capacitor/inductor combinations connected in parallel with each of said parts to form with at least one of said parts when connected by the switch in said one part to said secondary winding a tuned oscillatory circuit having a natural frequency higher than the operating frequency of the contact means such that the current pulses in said tuned circuit decline to zero and reverse prior to each opening of the contact means and the reversed currents in said tuned circuit maintain current in said secondary winding and thereby the rectangular wave form in the load circuit and inductively through said secondary winding reduce current through the contact means sinusoidally to zero prior to and during each open float period of said contact means.

6. In an arrangement for obtaining an alternating current of rectangular wave form from a direct current source by means of reversing interruptor contacts in circuit with said source, the combination with a transformer, conductively separate primary and secondary windings in said transformer, said primary winding connected to said reversing interruptor contacts and supplied from said source by said contacts with an alternating current, and said secondary winding connected to a load circuit for supplying alternating current to said load circuit, of a plurality of parallel parts in said load circuit independently connectable with said secondary winding, a switch in each of said parts, and capacitors and inductors connected one of each in series to form each of a plurality of capacitor/inductor combinations, one of said capacitor/inductor combinations connected in parallel with the primary winding of the transformer and the others of said capacitor/inductor combinations connected each in parallel with one of said parts to form, with at least one of said parts when connected by the switch in said part to said secondary winding, a tuned oscillatory circuit having a natural frequency higher than the operating frequency of the contact means such that the current pulses in said tuned circuit decline to zero and reverse prior to each opening of the contact means and the reversed currents in said tuned circuit maintain current in said primary and secondary windings and thereby the rectangular wave form in the load circuit and reduce current through the contact means sinusoidally to zero prior to and during each open float period of said contact means.

LIONEL SPARKE DISTIN.
CECIL VICTOR WILMAN.

REFERENCES CITED

The following references are of record in the file of this patent:

UNITED STATES PATENTS

| Number | Name | Date |
|---|---|---|
| 1,543,475 | Lemmon | June 23, 1925 |
| 2,237,003 | Kiltie | Apr. 1, 1941 |
| 2,265,717 | Bedford | Dec. 9, 1941 |
| 2,291,069 | Brown | July 28, 1942 |
| 2,310,742 | Lord | Feb. 9, 1943 |

OTHER REFERENCES

Vibrator Power Supply Design, pp. 9–12, 107–118, especially pages 11, 108 and 109, by P. R. Mallory & Co., Inc., Indianapolis 6, Indiana, March 1947.